July 13, 1948.  W. V. THELANDER  2,444,964
AUTOMATIC CLUTCH
Filed April 27, 1944  2 Sheets-Sheet 1
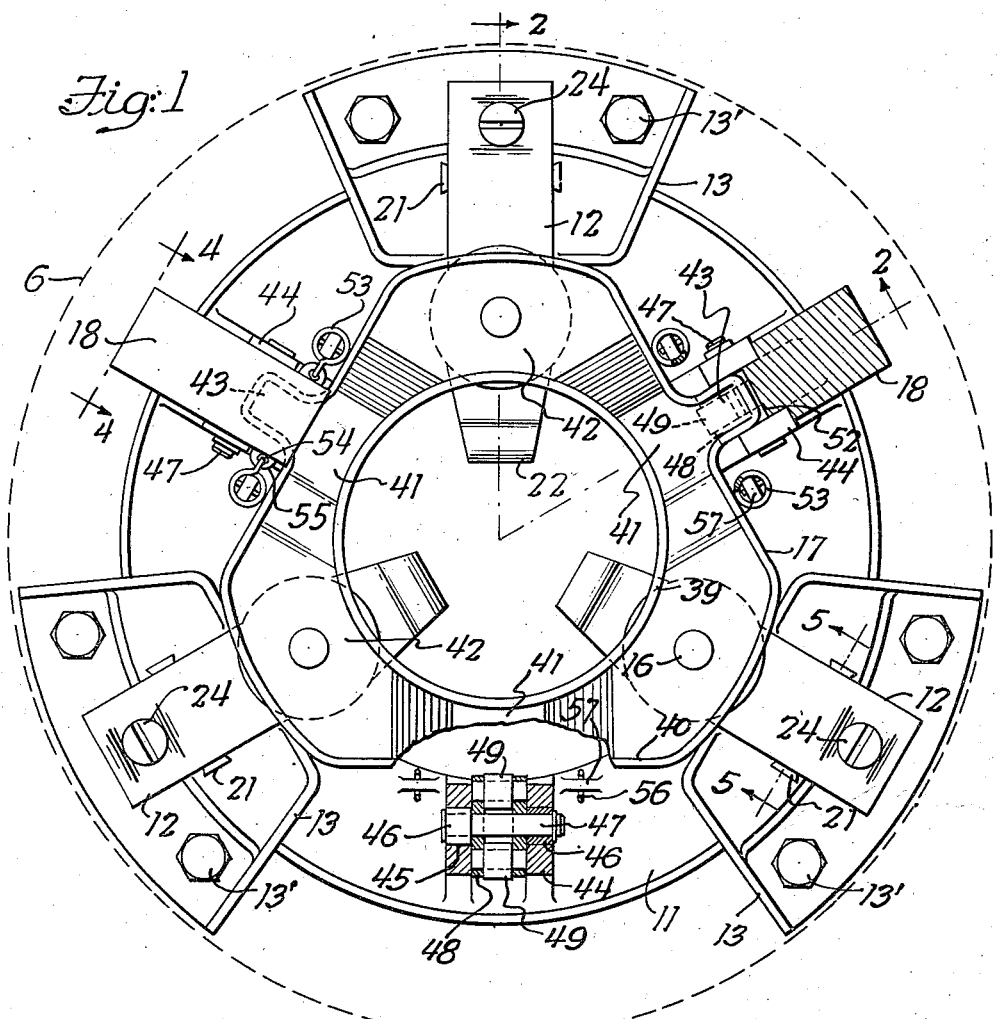
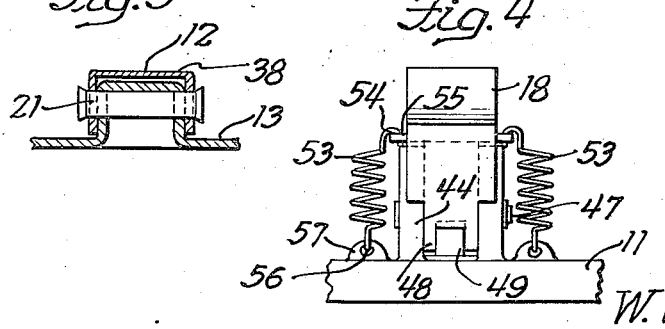
Inventor
W. Vincent Thelander
Andrew F. Wintercorn
Atty.

July 13, 1948.  W. V. THELANDER  2,444,964
AUTOMATIC CLUTCH
Filed April 27, 1944  2 Sheets-Sheet 2
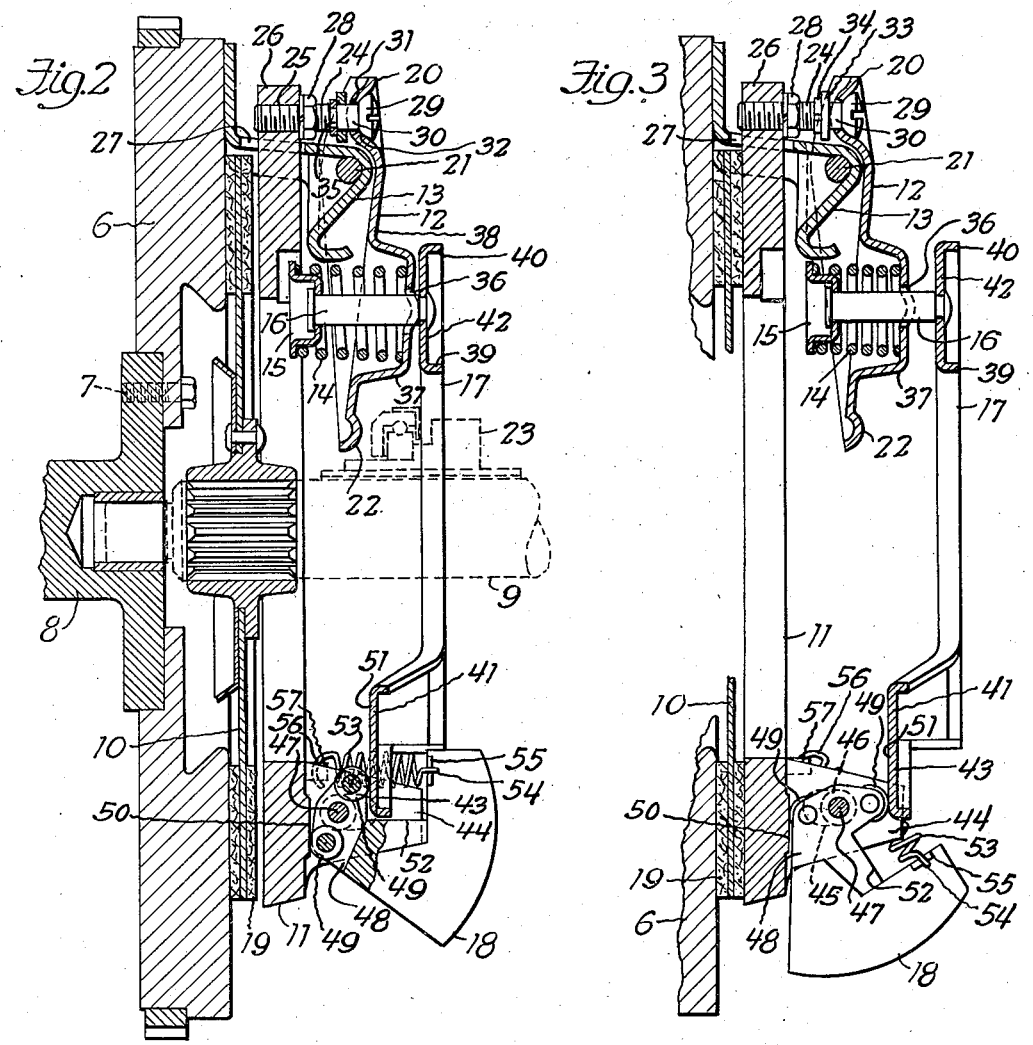
Inventor
W. Vincent Thelander
Andrew F. Wintercorn
Atty.

Patented July 13, 1948

2,444,964

UNITED STATES PATENT OFFICE 2,444,964

AUTOMATIC CLUTCH

W. Vincent Thelander, Auburn, Ind., assignor to Dana Corporation, Toledo, Ohio, a corporation of Virginia Application April 27, 1944, Serial No. 532,969

13 Claims. (Cl. 192—105)

This invention relates to automatic clutches for automotive use generally, and is more particularly concerned with an automatic clutch embodying the features disclosed in Patent #1,985,301, issued December 25, 1934, in which I am a co-inventor.

The clutch disclosed in the aforesaid patent has a separate spring for each pressure-transmitting lever, disposed in such a way that the lever multiplies the pressure of the spring to insure positive engagement of the clutch, although the springs are disposed so that there is a certain mechanical advantage in the operation of the levers in overcoming the action of the springs in the disengagement of the clutch, whereby to have light pedal action. The principal object of my present invention is to provide an automatic clutch utilizing the novel feature just mentioned, and including a spring loading ring in combination with the plurality of levers and their springs, arranged to be moved in the spring loading direction by means of a plurality of spring-restrained, speed-responsive fly-weights mounted on the pressure plate turning with the fly-wheel.

Another object of the invention is to provide an automatic clutch retaining substantially all of the advantageous features of the clutch forming the subject matter of the aforesaid patent, as, for example, the use of sheet metal stampings, not only for the pressure-transmitting levers, but also the brackets constituting the supports, and the spring loading ring, whereby to secure lightness, cheapness and durability, and greater uniformity in quantity production, due to the reduction in the number of machining operations required.

Another object is to provide the fly-weights in equally circumferentially spaced relation with respect to the spring loading ring, these weights being disposed at points between the brackets supporting the pressure-transmitting levers, and being furthermore of novel design, having notches provided on their inner sides to receive those portions of the spring loading ring that are arranged to cooperate with the rollers on the crossheads formed on the slidably pivoted ends of said weights, the arrangement described being advantageous from the standpoint of compactness so that very little, if any, more space is required for this automatic clutch than is required for the earlier non-automatic clutch.

The invention is illustrated in the accompanying drawings, in which—

Fig. 1 is a rear view of an automatic clutch embodying my invention;

Fig. 2 is a cross-section on the broken line 2—2 of Fig. 1, showing the clutch disengaged;

Fig. 3 is a similar, but fragmentary section, showing the clutch engaged;

Fig. 4 is an end view of one of the fly-weights taken on the line 4—4 of Fig. 1, and Fig. 5 is a sectional detail on the line 5—5 of Fig. 1.

The same reference numerals are applied to corresponding parts throughout the views.

Referring first mainly to Figs. 1 and 2, the reference numeral 6 designates a fly-wheel mounted in the usual way, as indicated at 7, on the rear end of the engine crankshaft 8, whereby to constitute the driving element. A shaft, indicated at 9, constitutes the driven element and extends rearwardly into the gear box of the transmission, there being a housing about the fly-wheel and clutch assembly at the front end of the gear box, as is well known. The clutch comprises a disc 10, carried on a hub splined on the front end of the shaft 9 in the usual way, and a pressure plate 11 arranged to engage the disc 10 with the fly-wheel 6. In the ordinary, conventional, non-automatic clutch, a plurality of springs is provided, acting between the pressure plate and a back plate bolted onto the rim of the fly-wheel, normally to keep the clutch firmly engaged, and levers are provided acting between the pressure plate and the back plate to disengage the clutch against the action of the springs. In the present case, however, a plurality of pressure-transmitting levers 12 are mounted on brackets 13, bolted, as indicated at 13', to the fly-wheel 6, and there are coiled compression springs 14 acting between washers 15 and the levers 12, to urge the levers in the proper direction to apply pressure to the pressure plate 11, to frictionally engage the disc 10 between the pressure plate and the fly-wheel. In the earlier patent mentioned, the springs 14 were supported on seats provided therefor directly on the brackets 13, but in the present automatic clutch these seats are eliminated, and the washers 15 are provided, connected by studs 16 with the spring loading ring 17, which, as hereinafter described, is arranged to be moved in the spring loading direction by the spring-restrained, speed-responsive, centrifugal fly-weights 18, whereby automatically to cause engagement of the clutch when the engine is speeded up to a predetermined extent above idling speed. The usual pads or facings 19 are provided on the opposite sides of the disc 10 around the margins thereof, to give the desired engagement on the back face of the fly-wheel and the front face of the pressure plate 11. Each of the levers 12 is pivoted near the outer end 20 on its associated bracket 13, as at 21, and the spring 14, cooperating with the lever, is disposed so as to be active against the lever near its inner end 22, whereby to secure the desired pressure multiplication and tend toward more positive engagement of the clutch, as described in the earlier patent. While the pressure of the springs is multiplied through the levers, it is nevertheless apparent that there is a certain mechanical advantage obtained also in the disengagement of the clutch, inasmuch as the levers are operable at their inner ends 22 by means of the usual throw-out collar, indicated at 23, by depression of the clutch pedal, and, of course, with this mechanical advantage, a lighter pedal action is obtained. As pointed out in the earlier patent, another advantage of this location of the springs 14 in closely spaced relation to the pivots 21 for the levers 12, is that there is very little loss of spring pressure when the clutch facings 19 become worn, whereas if the springs were disposed at the inner ends of the levers, there would be appreciable expansion of the springs resulting from slight wear of the clutch facings, and, consequently, considerable loss of spring pressure. This is equally important in the present automatic clutch because, as will soon appear, the fly-weights are capable of moving the spring loading ring 17 only through a fixed distance, and hence the springs 14 will be thereby loaded only to a predetermined limited extent. It should be clear in Fig. 3 that, regardless of the fact that the engine is running at a speed sufficient to cause automatic engagement of the clutch, the clutch may be disengaged by depression of the clutch pedal. The levers 12, under those circumstances, compress the springs 14 slightly beyond the extent illustrated in Fig. 3, and the pressure plate 11 is positively retracted from the fly-wheel through the medium of the adjustable screw connections 24.

The screws 24 are threaded in holes 25 provided in radially projecting lugs 26 formed on the pressure plate 11 and projecting through slots 27 provided therefor in the brackets 13. Jam nuts 28 are threaded on the screws 24 to be tightened against the lugs 26 to lock the screws in adjusted positions. Spherically conformed heads 29 are provided on the screws next to the smooth cylindrical neck portions 30, which are received in the flared holes 31 provided therefor in the outer end portions 20 of the levers, spherically conformed depressions 32 being provided in said outer end portions to receive the heads 29 similarly as a ball is received in the socket of a ball-and-socket joint. A washer 33 is freely rotatable on the neck 30 behind each of the socket portions 32, and a split spring ring 34 is entered in a groove 35 behind the neck 30 to retain the washer and present endwise movement of each screw 24 with respect to the outer end of its associated lever, while permitting freedom of rotary adjustment, and, of course, also free oscillatory movement of the levers with respect to the screws.

The spring loading ring 17 has its studs 16 projecting through holes 36 provided therefor in the diametrically ribbed centers of the rearwardly projecting bosses 37 struck from the web portion 38 of the levers, the levers being formed from sheet metal, as described in the earlier patent, and being generally channel-shaped in cross-section for strength and rigidity. The ring 17 is concentric with the fly-wheel 6, disc 10 and pressure plate 11, and is of stamped sheet metal construction and provided with a rearwardly projecting, circular flange 39 on the inner periphery, and another flange 40 on the outer periphery, for greater strength and rigidity. The ring has circumferentially spaced portions 41 thereof struck out of the plane of the intermediate portions 42 that carry the studs 16 for cooperation with the fly-weights 18. A radially projecting portion 43 is provided on each of these depressed portions 41 for slidable guiding engagement between spaced parallel ears 44 projecting rearwardly from and cast integral with the pressure plate 11 at the three equally circumferentially spaced points, midway between the levers 12, where the fly-weights 18 are located. The ears 44 provide slidable pivotal support for the fly-weights and have registering elongated slots 45 provided therein to accommodate rollers 46 that are mounted on the ends of the cross-pins 47, which extend through registering holes in the middle of the forked cross-head portions 48 formed on the inner ends of the fly-weights. Two rollers 49 are mounted in each forked cross-head 48 on opposite sides of the pivot pins 47, one to roll on the flat surface 50 provided therefor on the back of the pressure plate 11 and the other to roll on the flat inner face 51 of the radially projecting portion 43 on the spring loading ring 17, as illustrated in Figs. 2 and 3. The fly-weights are notched out on their inner side, as shown at 52, to provide operating clearance for the radially projecting portions 43 of the spring loading ring 17, one-half of the cross-head portion 48 on the inner ends of the fly-weights forming the one side of these notches 52, so that the radially projecting portions 43 of the ring 17 are disposed in direct operative relationship to these cross-heads for movement of the ring 17 automatically in response to a predetermined increase in the speed of rotation of the fly-wheel above idling speed. There are two coiled tension springs 53 cooperating with each of the fly-weights 18 to hold the same normally in the retracted position shown in Fig. 2, these springs being disposed on opposite sides of the fly-weight and attached at one end, as indicated at 54, to small ears 55 provided on the opposite sides of the fly-weight and attached at the other end, as indicated at 56, to small ears 57 projecting rearwardly from the pressure plate. The points of connection of the springs 53 with the pressure plate and fly-weights are such that, even when the fly-weights are swung outwardly to the extreme position illustrated in Fig. 3, the pull of the springs is still far enough from the pivot pins 47, measured radially inwardly with respect to the pressure plate, for these springs to serve their intended purpose and return the fly-weights to retracted position, as shown in Fig. 2, as soon as the engine speed is decreased below a predetermined critical speed to the idling speed.

In operation, it should be understood that the springs 14 are assembled with a predetermined pre-load compression, and therefore serve to move the levers 12 in the direction of engaging the clutch in the initial outward pivotal movement of the fly-weights 18, and when the engine speed rises above the critical speed, the fly-weights 18 move outwardly farther and accordingly move the ring 17 so as to compress the springs 14, and thereby cause the pressure plate 11 to hold the clutch disc 10 engaged with the fly-wheel under a spring pressure above the pre-load pressure an extent depending upon the particular angularity of the fly-weights. The fly-weights are restrained by the springs 53 and do not assume the extreme position shown in Fig. 3 until the engine speed is sufficient for the centrifugal force to overcome the resistance of these springs to the extent indicated. It will therefore be apparent that in the normal acceleration of the engine, as between the shifting of gears, the springs 14 will be gradually compressed more and more, up to the extreme condition illustrated in Fig. 3, so that the engagement of the clutch is proportionately smooth and there is no tendency for the clutch to grab. This clutch, like that of the earlier patent, when installed, is completely visible from the back of the fly-wheel, so that the matter of inspection and adjustment is greatly facilitated. The complete exposition of all of the parts is also highly advantageous from the standpoint of the parts keeping cool in operation, there being very good ventilation. Furthermore, there is a good opportunity for any dirt or worn-off particles from the clutch disc to escape from the clutch by centrifugal action in the operation of the clutch. This automatic clutch, similarly to the non-automatic clutch of the earlier patent, is of extremely simple, economical and practical construction.

It is believed that the foregoing description conveys a good understanding of all of the objects and advantages of my invention. The appended claims have been drawn with a view to covering all legitimate modifications and adaptations.

I claim:

1. In a clutch comprising a driving element and a driven element, a pressure plate for holding the driving and driven elements frictionally engaged, a plurality of levers for communicating pressure to the pressure plate under spring pressure whereby to cause engagement of the clutch, supports for said levers carried by the driving element and each comprising a pivot for the associated lever near the outer end of the lever, said levers being operable manually at their inner ends, a single compressible spring means adapted to apply pressure to each lever whereby to apply pressure to the pressure plate for engagement of the clutch, a single spring loading element operatively associated with said spring means, the spring means and spring loading element being supported on and connected in operative relationship to the levers, and a centrifugal fly-weight turning with the driving element and arranged to move said spring loading element in the spring loading direction when the driving element exceeds a predetermined speed of rotation.

2. In a clutch comprising a driving element and a driven element, a pressure plate for holding the driving and driven elements frictionally engaged, a plurality of levers for communicating pressure to the pressure plate under spring pressure whereby to cause engagement of the clutch, supports for said levers carried by the driving element and each comprising a pivot for the associated lever near the outer end of the lever, said levers being operable manually at their inner ends, a single compressible spring means adapted to apply pressure to each lever whereby to apply pressure to the pressure plate for engagement of the clutch, a single spring loading element operatively associated with said spring means, the spring means and spring loading element being supported on and connected in operative relationship to the levers, means cooperating with the spring means and spring loading element to support the same on said levers and maintain the spring means under a predetermined pre-load compression, and a centrifugal fly-weight turning with the driving element and arranged to move said spring loading element in the spring loading direction when the driving element exceeds a predetermined speed of rotation, whereby the clutch is engaged under increased spring pressure.

3. In a clutch comprising a fly-wheel constituting the driving element, and a clutch disk constituting the driven element, a pressure plate for holding the clutch disk frictionally engaged with the fly-wheel, a plurality of levers substantially radially disposed with respect to the fly-wheel and pivoted near their outer ends with respect to the latter for communicating movement to the pressure plate under spring pressure to cause engagement of the clutch, said levers being disposed in equally circumferentially spaced relation relative to the fly-wheel, a plurality of coiled compression springs equal in number to the levers and each active against one of said levers at a point between the pivot and the inner end of the lever for applying pressure to the pressure plate, the inner ends of said levers being manually operable to relieve pressure on the pressure plate, a spring loading ring cooperating with all of said springs for compression thereof, and a plurality of centrifugal fly-weights turning with the fly-wheel and disposed in equally circumferentially spaced relation midway between the levers and arranged to move the aforesaid ring in the spring loading direction when the fly-wheel exceeds a predetermined speed of rotation.

4. A clutch as set forth in claim 3, including spring caging means cooperating with said levers and spring loading ring to maintain the springs under a predetermined pre-load compression.

5. In a clutch, the combination of driving and driven members having surfaces adapted to engage, a pressure member for causing engagement of said surfaces, a pressure-transmitting lever pivotally supported near the outer end thereof which is arranged to transmit pressure to the pressure member, spring means acting between the pivot and the inner end of said lever at such a distance from the pivot that the pressure of the spring means is multiplied in the action of the lever on the pressure member, said lever being movable manually in the other direction at its inner end at a point farther removed from the pivot than the aforesaid spring means whereby to secure mechanical advantage in relieving the spring pressure from the pressure member, a spring loading element operatively associated with said spring means, and a centrifugal fly-weight turning with the driving member and arranged to move said spring loading element in the spring loading direction when the driving member exceeds a predetermined speed of rotation.

6. In a clutch comprising a driving element and a driven element, a pressure plate for holding the driving and driven elements frictionally engaged and turning with the driving element, a plurality of levers for communicating pressure to the pressure plate under spring pressure whereby to cause engagement of the clutch, supports for said levers carried by the driving element and each comprising a pivot for the lever near the outer end of the lever, means linking the outer ends of said levers to said pressure plate, a plurality of springs equal in number to the levers and each active against one of said levers at a point between the pivot and the inner end of the lever for applying pressure to the pressure plate, said levers being manually operable in the opposite direction at their inner ends, a spring loading ring operatively associated with the plurality of springs, and a plurality of spring restrained centrifugal fly-weights pivotally mounted on the pressure plate and arranged to swing outwardly under centrifugal force and move said ring in the spring loading direction when the driving element exceeds a predetermined speed of rotation.

7. In a clutch, the combination of driving and driven members having surfaces adapted to engage, a pressure member for causing engagement of said surfaces, a pressure-transmitting lever pivotally supported near the outer end thereof which is arranged to transmit pressure to the pressure member, spring means active at one end against said levers, a spring loading element operatively associated with the other end of said spring means, and a centrifugal fly-weight turning with the driving member and having a pivotal cross-head portion slidably pivotally mounted relative thereto and so arranged relative to said driving member and spring loading element that when the weight swings outwardly under centrifugal force said cross-head moves the spring loading element away from the driving member in the spring loading direction.

8. In a clutch, the combination of driving and driven members having surfaces adapted to engage, a pressure member for causing engagement of said surfaces, a pressure-transmitting lever pivotally supported near the outer end thereof which is arranged to transmit pressure to the pressure member, a single compressible spring means active at one end against said lever, a spring loading element operatively associated with the other end of said spring means, the spring means and spring loading element being supported on and connected in operative relationship to the lever, supports for centrifugal fly-weights turning with the driving member, and centrifugal fly-weights pivoted on said supports and having crank portions arranged to engage and move said spring loading element when said weights swing outwardly under centrifugal force.

9. In a clutch, the combination of driving and driven members having surfaces adapted to engage, a pressure member for causing engagement of said surfaces, a pressure-transmitting lever pivotally supported near the outer end thereof which is arranged to transmit pressure to the pressure member, spring means active at one end against said levers, a spring loading element operatively associated with the other end of said spring means, forked supports for centrifugal fly-weights turning with the driving member, and centrifugal fly-weights having T-shaped end portions pivotally and slidably mounted by the middle portions of their T's in said forked supports, rollers on the opposite ends of said T's rollably engaging surfaces fixed in relation to said supports and other surfaces on said spring loading element whereby to move the latter in spring loading direction when said weights swing outwardly under centrifugal force.

10. A clutch as set forth in claim 9 wherein the outer end portions of said fly-weights are enlarged in relation to the pivoted T-portions, said clutch including a pair of tension springs for each fly-weight disposed on opposite sides of said forked supports and connected to said supports and weights so as to tend normally to swing said weights to retracted position.

11. In a clutch comprising a driving element and a driven element, a pressure plate for holding the driving and driven elements frictionally engaged, a plurality of levers for communicating pressure to the pressure plate under spring pressure whereby to cause engagement of the clutch, supports for said levers carried by the driving element and each comprising a pivot for the lever near the outer end of the lever, a plurality of springs equal in number to the levers and each active against one of said levers at a point between the pivot and the inner end of the lever for applying pressure to the pressure plate, said levers being manually operable in the opposite direction at their inner ends, a spring loading ring behind the inner end portions of said levers, pins extending from said ring freely through holes provided in said levers and through said springs and connected to spring abutment washers so as to cage said springs under a preload pressure, and a plurality of centrifugal fly-weights turning with the driving element and arranged to move said ring in the spring loading direction when the driving element exceeds a predetermined speed of rotation.

12. In a clutch comprising a driving element and a driven element, a pressure plate for holding the driving and driven elements frictionally engaged, a plurality of levers for communicating pressure to the pressure plate under spring pressure whereby to cause engagement of the clutch, supports for said levers carried by the driving element and each comprising a pivot for the lever near the outer end of the lever, a plurality of springs equal in number to the levers and each active against one of said levers at a point between the pivot and the inner end of the lever for applying pressure to the pressure plate, said levers being manually operable in the opposite direction at their inner ends, a spring loading ring behind the inner end portions of said levers, pins extending from said ring freely through holes provided in said levers and through said springs and connected to spring abutment washers so as to cage said springs under a preload pressure, a plurality of projections on the back of said pressure plate having slidable guiding engagement with peripheral portions of said loading ring, and spring restrained centrifugal fly-weights pivoted on said projections and having crank portions operatively engaging the peripheral portions of said loading ring to move the latter in spring loading direction when the fly-weights swing outwardly under centrifugal force.

13. In a clutch comprising a driving element and a driven element, a pressure plate for holding the driving and driven elements frictionally engaged, a plurality of levers disposed in circumferentially spaced relation with respect to said driving element for communicating pressure to the pressure plate to cause engagement of the clutch, said levers being pivotally supported near their outer ends on said driving element, a plurality of springs for applying pressure to the pressure plate through said levers, a spring loading ring operatively associated with said springs, and a plurality of centrifugal fly-weights pivotally mounted with respect to said driving element in circumferentially spaced relation around the periphery of said ring, each weight being cut away on the inner side to receive a peripheral portion of said ring, one side of the cut-out defining an end portion of a cross-head on the pivoted end of the weight, said weight being slidably pivoted intermediate the ends of said cross-head relative to the driving element, whereby said cross-head acts to spread the ring away from the driving element in spring loading direction when the weight swings outwardly under centrifugal force.

W. VINCENT THELANDER.

REFERENCES CITED

The following references are of record in the file of this patent:

UNITED STATES PATENTS

| Number | Name | Date |
| --- | --- | --- |
| 1,997,264 | Nutt | Apr. 9, 1935 |
| 2,062,484 | Timian | Dec. 1, 1936 |
| 2,115,277 | Nutt et al. | Apr. 26, 1938 |
| 2,218,379 | Evans | Oct. 15, 1940 |
| 2,326,279 | Banker | Aug. 10, 1943 |

FOREIGN PATENTS

| Number | Country | Date |
| --- | --- | --- |
| 620,232 | France | Jan. 15, 1927 |